Oct. 4, 1927.
R. L. SKINNER
1,644,094
LUBRICATION SYSTEM FOR INTERNAL COMBUSTION ENGINES
Filed May 28, 1926
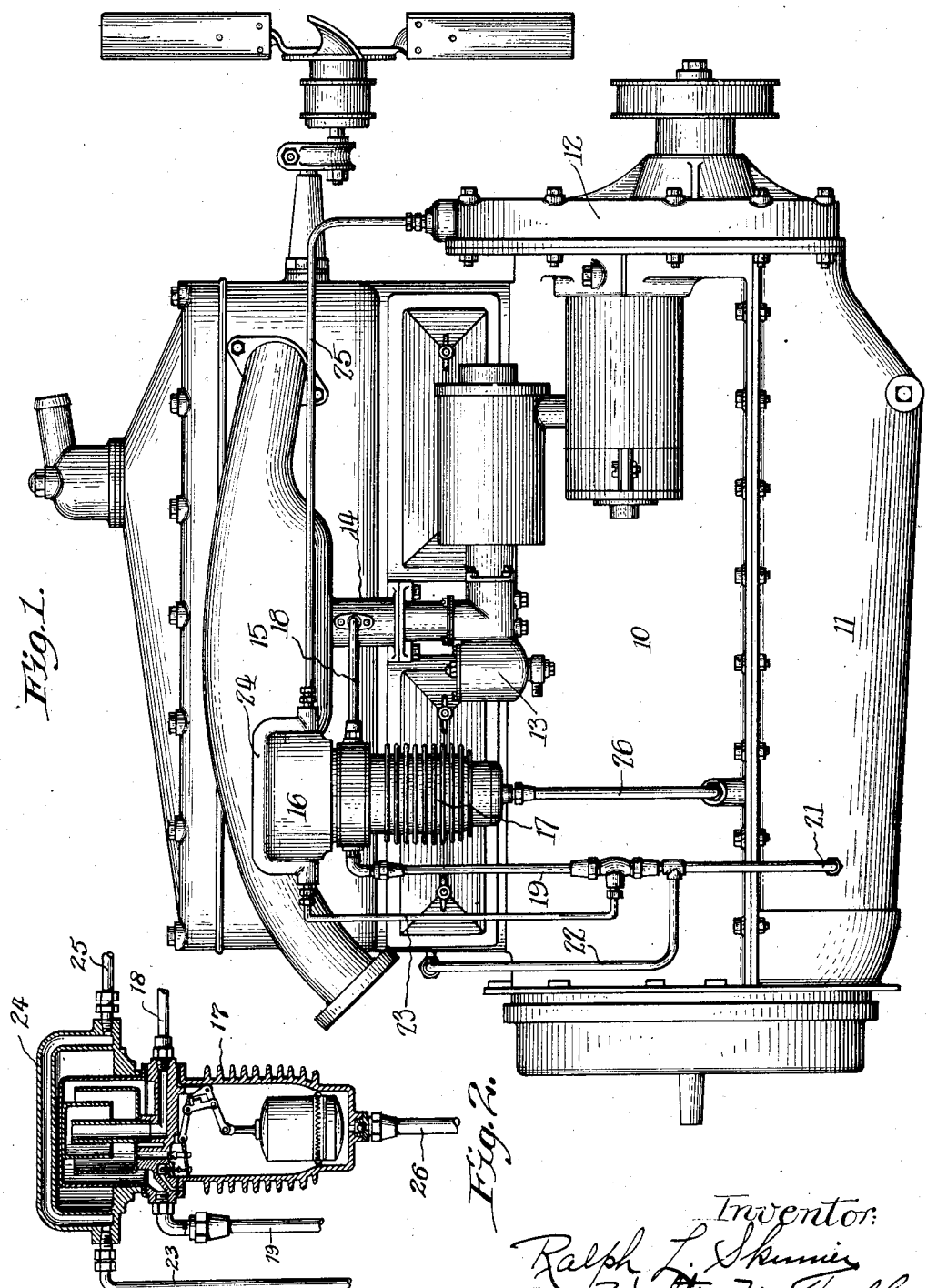

Patented Oct. 4, 1927.

1,644,094

UNITED STATES PATENT OFFICE.

RALPH L. SKINNER, OF DETROIT, MICHIGAN, ASSIGNOR TO SKINNER AUTOMOTIVE DEVICE CO., INC., OF DETROIT, MICHIGAN, A CORPORATION OF CALIFORNIA.

LUBRICATION SYSTEM FOR INTERNAL-COMBUSTION ENGINES.

Application filed May 28, 1926. Serial No. 112,290.

My invention relates to novel features of construction in internal-combustion engines or motors and pertains particularly to improvements or betterments in the lubrication systems thereof, whereby to maintain the lubricant or oil in better condition for the performance of its friction-reducing properties.

One aim of the invention is to treat the oil to eliminate its gasifiable ingredients or constituents with which it may have become contaminated or polluted, preferably, but not necessarily, under the influence of a partial vacuum and under heat, the rectified oil being returned to the engine or motor for further use.

By thus maintaining the oil in good condition, many advantages accrue, particularly the wear of the moving parts is materially reduced affording the engine a longer serviceable life.

One feature of the invention resides in the aeration of the withdrawn impure oil which considerably facilitates and aids the reclaiming or purifying process.

To enable those skilled in this art to have a full understanding of the invention and its several advantages, a present desirable embodiment of the same has been illustrated in the accompanying drawing forming a part of this specification and to which reference should be had in connection with the following detailed description of the appliance therein shown.

In this drawing:

Figure 1 is a side elevation of an internal-combustion engine equipped with the new appliance; and Figure 2 is a vertical section through the rectifier.

Referring to this drawing, it will be seen that the internal-combustion engine 10 has the usual crank-case 11 containing a supply of oil, a gear-casing 12 associated with the front end thereof, the customary carburetor 13 delivering the gaseous fuel mixture through a pipe or connection 14 into the intake-manifold (not shown), and the exhaust-manifold 15 equipped with a part 16 through which a portion of the hot discharging gases flow to heat the upper portion of an oil-rectifier 17 which may be of any appropriate structure, such for example, as is presented in my earlier United States Patent No. 1,502,921, granted July 29, 1924.

Such oil separator or rectifier is connected by a pipe 18 to the intake-manifold connection 14 and it is also joined to the crank-case 11 at a point 21 below the oil level therein by a pipe 19.

The pipe or tube 22 delivers the aerated oil withdrawn from around the reciprocating pistons of the engine, as disclosed in my above-identified earlier United States patent, to the pipe 19.

The suction present in the rectifier, created by the sub-atmospheric pressure in the intake-manifold, acting through the pipe 18, serves to draw or suck oil-charged air out of the top of the gear casing or housing 12 through a pipe 25, through a hollow heated conduit 24 on the top of the rectifier heater 16 and through a pipe 23 joined to the pipe 19.

Thus the column of oil ascending from the crank-case through the pipe 19, by reason of the suction existing in the rectifier, becomes mixed with and more or less charged with air from the aerated oil flowing into pipe 19 through pipe 22, additional aerating air being drawn into the oil through the pipes 23, 24, and 25.

The withdrawal of this small amount of oil-charged air from the upper part of the crank-case through the gear-casing tends not only to keep the gears in the latter well lubricated but it also prevents etching or corrosion of the parts by the removal of the water, vapor or moisture, and it serves also to maintain a slight vacuum in the crank-case, thus overcoming any tendency for the oil to leak outwardly through the bearings.

Hence the column of oil is aerated by the two supplies of air, one from the air-charged oil entering through the pipe 22 and the other from the heated, oil-charged air flowing through the conduits 23, 24, and 25, it being understood, of course, that the air passing through pipe 22 is more or less heated by reason of its having passed through oil-collecting channels or grooves in the heated engine pistons.

Thus all of the oil entering the rectifier through the tubular connection 19 is adequately permeated or subdivided by the air assuring a complete and efficient purification of the oil in the rectifier, wherein all of its gasifiable or vaporizable contaminating constituents are drawn off under the heat and suction action into the intake-manifold where they pass into the cylinders and are consumed as fuel in the usual way, the reclaimed or purified oil being delivered intermittently or continuously from the rectifier through the discharge pipe 26 into the upper part of the crank-case containing the oil supply.

As will be appreciated, the invention, as defined by the appended claims, is not limited or restricted to this single particular embodiment and many changes may be incorporated therein and the structure still fall within the purview of the invention and have many of the important advantages accruing from the latter.

For example, either one of the two aerating means for the withdrawn crank-case oil may be used singly, and, in fact, the two means for withdrawing or abstracting the oil from the piston channels and for drawing off the oil-laden air from the gear-case and associated crank-case may be used satisfactorily together without the liquid oil sucked from the sump or lower part of the crank-case.

I claim:

1. In an internal-combustion engine lubrication system, the combination of means to withdraw liquid lubricant from the crank-case of the engine, means to aerate such lubricant after its withdrawal by air taken from the crank-case, means to rectify such aerated lubricant, and means to return the purified lubricant to the lubrication system of the engine.

2. In an internal-combustion engine lubrication system, the combination of means to withdraw liquid lubricant from the crank-case of the engine, means to aerate such lubricant after its withdrawal by oil-charged air from the crank-case drawn through the gear-case connected therewith, means to rectify such aerated lubricant, and means to return the purified lubricant to the lubrication system of the engine.

3. In an internal-combustion engine lubrication system, the combination of means to withdraw liquid lubricant from the crank-case of the engine, means to aerate the withdrawn lubricant by air taken from said crank-case through the gear-case connected therewith, means to heat such air, means to rectify such aerated lubricant, and means to return the purified lubricant to the lubrication system of the engine.

4. In an internal-combustion engine lubrication system, the combination of means to withdraw liquid lubricant from the engine, means to mix such withdrawn lubricant with aerated lubricant withdrawn from around the pistons of the engine, means to rectify such mixed aerated lubricant, and means to return the purified lubricant to the lubrication system of the engine.

5. In an internal-combustion engine lubrication system, the combination of means to withdraw lubricant from around the pistons of the engine, means to aerate such lubricant after withdrawal by air withdrawn from another part of the engine, means to rectify such aerated lubricant, and means to return the purified lubricant to the lubrication system of the engine.

6. In an internal-combustion engine lubrication system, the combination of means to withdraw aerated lubricant from around the pistons of the engine, means to further aerate such lubricant after withdrawal, means to rectify the aerated lubricant, and means to return the purified lubricant to the lubrication system of the engine.

7. In an internal-combustion engine lubrication system, the combination of means to withdraw liquid lubricant from the crank-case of the engine, means to aerate such lubricant after withdrawal by air withdrawn from the crank-case of the engine, means to mix such aerated lubricant with other aerated lubricant withdrawn from around the pistons of the engine, and means to rectify the completely aerated lubricant, and means to return the purified lubricant to the lubrication system of the engine.

In witness whereof I have hereunto set my hand.

RALPH L. SKINNER.